United States Patent

[11] 3,603,185

| [72] | Inventor | John B. Curry<br>3849 York Blvd., Los Angeles, Calif. 90065 |
|---|---|---|
| [21] | Appl. No. | 831,403 |
| [22] | Filed | June 9, 1969 |
| [45] | Patented | Sept. 7, 1971 |

[54] METHOD AND TOOL FOR MOUNTING LATHE METAL CUTTING-TOOL BITS FOR USE ON METAL-TURNING LATHES FOR MACHINING OPERATIONS
1 Claim, 7 Drawing Figs.

| [52] | U.S. Cl. | 82/36 R, 82/37 |
|---|---|---|
| [51] | Int. Cl. | B23b 29/24 |
| [50] | Field of Search | 82/36, 36 A, 37 |

[56] References Cited
UNITED STATES PATENTS

| 1,636,167 | 7/1927 | Bozsin | 82/36 A |
|---|---|---|---|
| 2,571,530 | 10/1957 | Brekke | 82/36 |
| 3,191,471 | 6/1965 | Stewart | 82/36 |

*Primary Examiner*—Leonidas Vlachos

ABSTRACT: A tool for use on metal-turning lathes so to allow the lathe to do work generally assigned for heavier lathes, the tool comprising a block tool which carries a pair of tool cradles which are slideably fitted to the block tool, and each of the tool cradles comprising a means for supporting a tool bit or cutoff tool bit, while the block tool is secured to the lathe by the anchor bolt.

INVENTOR
JOHN B. CURRY

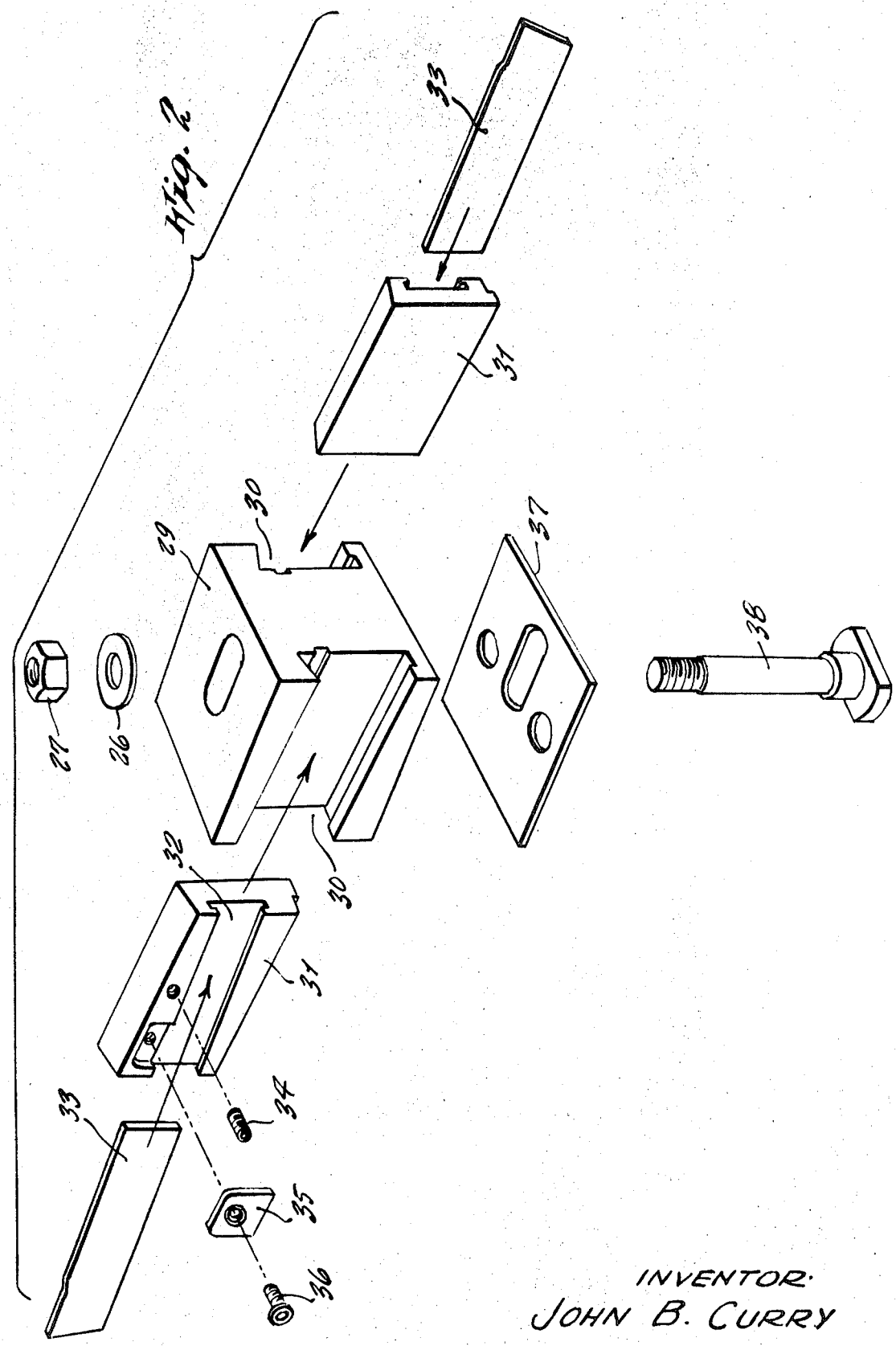

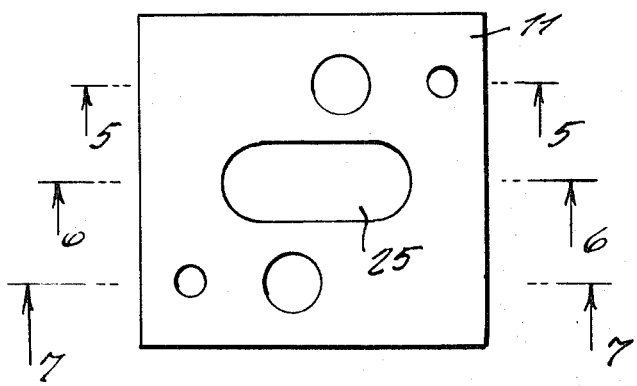
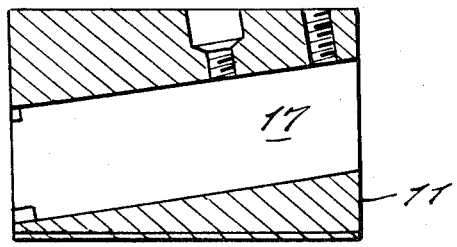
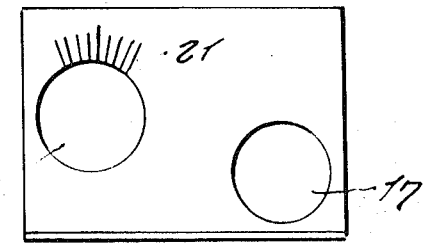
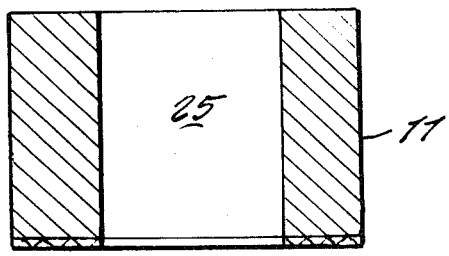
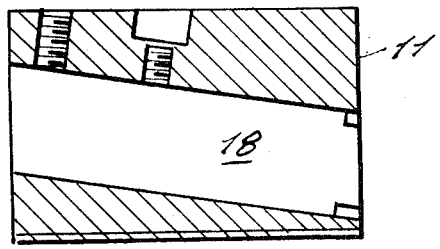

METHOD AND TOOL FOR MOUNTING LATHE METAL CUTTING-TOOL BITS FOR USE ON METAL-TURNING LATHES FOR MACHINING OPERATIONS

This invention relates generally to metal-cutting tools.

A principle object of the present invention is to provide a metal-turning lathe block cutting-bit toolholder that is designed for use on small, lightweight-type metal-turning lathes so that this lathe may be used for certain classes of machine work generally considered practical only on heavier, industrial type of metal lathes. Because of the necessary lightweight, the tool carriage does not have a large area of contact with the lathe bed, this and other lightweight factors do not prevent the tool bit cutting point from vibrating when the conventional toolpost tool bit holders are used. This vibration interferes with accurate, metal-turning, machine work.

Another object of the present invention is to provide a block cutting-bit toolholder providing a novel method of mounting cutting-tool bits, thus reducing the strain on the lathe tool carriage, the increased rigidity reducing or preventing cutting-tool point vibration. This permit both faster and more accurate metal-turning and allows this type of lathe to be used for work classified as experimental machine work, where specifications may call for extremely close tolerances and time is also an important factor.

Another object is to provide a block cutting-bit toolholder for a method of performing certain special machining operations that cannot be performed using other conventional equipment.

Yet a further object is to provide a block cutting-bit toolholder which is simple in design, inexpensive to manufacture, rugged in construction, easy to use and efficient in operation.

These and other objects will be readily evident upon a study of the following specifications and the accompanying drawings wherein:

FIG. 2 is an exploded perspective view of a modified form of the block tool, FIG. 3 is a top plan view of the block tool shown in FIG, 1, FIG. 4 is a rear elevation view of the block tool as viewed on line 4—4 of FIG. 1.

FIG. 5 is a cross-sectional view taken on the line 5—5 of FIG. 3,

FIG. 6 is a cross-sectional view taken on the line 6—6 of FIG. 3, and

FIG. 7 is a cross-sectional view taken on the line 7—7 of FIG, 3.

Figure 1:
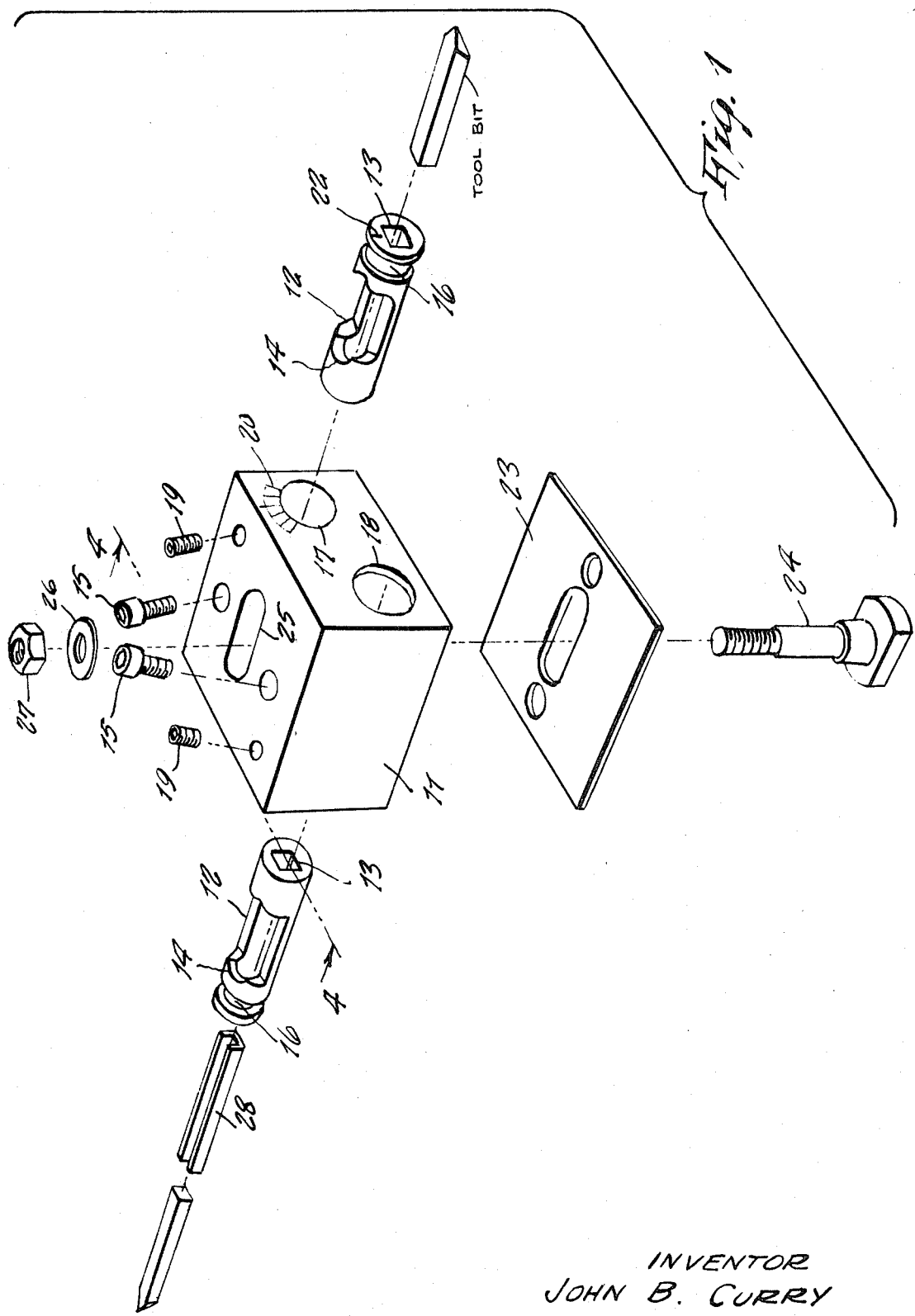
FIG. 1 is an exploded perspective view of the components of one form of the block tool.

Referring now to the drawings in detail, the block tool consists of a solid block of metal 11, in which various chambers, slots and openings are machined so that the various included parts of the unit may be inserted or attached thereto. Since this tool was designed to do precision work, various units have been produced, each unit performing a specific function. The basic design of all units is identical, the modification being only for the purpose of permitting certain machine operations to be performed more efficiently.

In the accompanying drawings, however, only one unit is shown, descriptions of other units being given later in the specification.

The cutting-tool bits are installed by inserting them in the tool bit cradle 12 which will be made of round metal stock with a square opening 13 machined through the center thereof. The center of this opening depends on the side of the cutting-tool bit for which it is designed which may be either ⅜-inch square or ½-inch square. These two tool cradles, however, are not interchangeable, the outer diameter of the ½-inch tool cradle being increased over that of the ⅜-inch tool cradle therefore each cutting-tool bit having its own block. The tool-cradle has a slot 14 machined through the center thereof so that the cutting-tool bit may be locked in place with locking screw 15. It has a groove 16 machined at the front end so that the tool cradle when inserted in the tool-cradle chamber 17 or 18, may be locked in place with the locking setscrew 19.

Each block has a scale 20, 21 stamped or engraved above the tool-cradle chamber. This scale has a center mark and degree marks both clockwise and counterclockwise. The tool cradle also has an engraved center mark 22. By matching the tool-cradle center mark with the proper scale degree mark, then locking the tool-cradle in place with the locking screw, the desired side clearance angle of the cutting-tool bit point is obtained, no top grinding of the tool bit for this purpose being necessary.

An adjustment plate 23 is attached to the bottom of each block 11 by means of screws. The block tool operates in a certain fixed position relative to the lathe axis. The distance between the top of the lathe cross-slide and the lathe axis varies with various makes and models of the same general size lathe.

Changing the thickness of the adjustment plate is all that is necessary to make a block tool usable on different model lathes. For metal-turning, the block tool is installed on the lathe cross-slide in the same relative position as that of the toolpost. The anchor bolt 24 head slides into the cross-slide slot and the slot passes through the block-mounting slot 25. The block is held in place by means of the washer 26 and nut 27. Smaller cutting-tool bits, often very useful on very special metal-turning operations, can also be used by using the tool bit cage 28. The tool bit cage is inserted in the tool-cradle in the same manner as the regular cutting-tool bit. The smaller cutting-tool bit is then inserted in the tool bit cage and adjusted and locked in place in the same manner as the regular tool bit.

The tool bit cage will take only the size of the cutting-tool bit for which it is designed, 3/16-inch and ¼-inch tool bit cages being provided for the ⅜-inch block tool and the 3/16-inch, ¼-inch and ⅜-inch sizes for the ½-inch block tool.

The block tool for mounting metal-turning cutting-tool bits is produced in the following designs:

A double unit, mounting two tool bits and a narrower, single unit, mounting one tool bit. The extended working position of the tool bit is on the right, making for metal cuts close to the lathe tailstock. The companion units, double and single, are identical except that the cutting-tool bit extends from the left side, for making metal cuts close to the lathe headstock, or for facing cuts.

Since the tool-cradle in all units is adjustable, cutting-tool bits for either right or left direction cuts may be mounted in any block unit. The cutoff tool bit holder block 29 operates on the same basic principle as the metal-turning tool bit holder block, but due to the changed shape of cutoff tool bits and the different manner in which it operates, a change is necessary in both the cutoff tool cradle and the cradle-mounting block.

The block 29 has slots 30 machined at an angle on each side. The tool cradle 31 is made of flat metal stock machined to fit the block slots. The cutoff tool bit mounting slot 32 in the tool cradle is machined at a 90°angle to the lathe axis, allowing the cutoff tool bit 33 to be moved back and forth in its slot without changing the height of the cutoff tool-cutting edge.

The cutting edge height is adjusted by moving the tool-cradle back or forward in its mounting slot unit the cutoff tool-cutting edge is at the lathe working center, then locking the tool-cradle in place with its locking screw 34. The cutoff tool bit 33 is locked in place in its slot by the clamp 35 and screw 36. The mounting block 29 has an adjustment plate 37 and an anchor bolt 38 similar to those described for cutting-tool mounting block 11.

In operation, the tool bit installation and adjustment is as follows:

Tool bits are installed in the block by first turning the tool-cradle to its proper position, indicated by the scale on block face, then locking the cradle in place by means of its locking setscrew. The block is then installed on the lathe cross-slide in working position, the tool bit being then moved forward until the cutting-point height matches that of the lathe work center and is then locked in place by its locking capscrew.

After the tool bit is locked in place, the blocks may be rotated, removed and reinstalled on the lathe cross-slide any number of times. The tool bits require no further adjustment until its position is intentionally changed.

It is important that precision-ground cutting-tool bits be used with the block tool. They not only improved the accuracy but reduce the time necessary for metal-turning operation.

The block tool provides for an easy, precision method of both shaping and sharpening cutting-tool bits, the only added equipment necessary being lathe headstock-mounted cone grinding wheels.

The process is quite simple, unlock the compound rest and set the cross-slide at 0° and mount the block, preferably a single unit, on the cross-slide, the side at right angle to the lathe axis. The compound rest is next used to set the block at the selected tool bit side-cutting face angle and the compound rest locked. The block tool-cradle is next turned to and locked in its selected position with its locking setscrew. The tool bit is now inserted in the tool-cradle and its locking capscrew, this completing the setup.

Although the most efficient side, front and rake angle clearance for tool bits used with the block tool vary somewhat from those shown on charts for the conventional tool post and tool bit holder cutting tools, the combination of the cross-slide and tool-cradle angles provide for all flat surface-grinding setups, for tool bits used in the block tool. Rounding of the cutting point for finishing tools may also be done, but hand grinding for this purpose is preferable.

The same equipment may be used for shaping and sharpening cutting-tool bits for use in regular tool posts and tool bit holders, if desired. A course-grit grinding cone is faster for shaping cutting-tool bits but a fine-grit stone is much better for finish grinding or sharpening tool bits when this process is used.

In facing operations, unless extended stock interferes, more accurate results are obtained if the block tool is mounted on the cross-slide using the same method describe for tool bit grinding, then using the compound rest to adjust the cutting-tool bit face to its proper operating position. The second tool bit, may for example be a cage-mounted ¼-inch bit ground for a special machining operation where lack of space did not permit the use of the regular ¾-inch tool bits. The cutoff toolholder block may be used to make cutoff operation in stock mounted in headstock keychuck, the cutting position being near the headstock. For most material ¾-inch diameter or less, only single cuts are necessary if the cutting position is near the headstock, or other equipment, such as center rest or tailstock center. Other positions, heavier stock or other materials will require double cuts. Single cuts may save material and also, both directly and indirectly save machine operating time.

A single block, right hand, for cutting toward the headstock, may be used, mounted on the cross-slide in right-hand thread position and holding a thread-cutting tool bit. This block tool setup provides for both fast and accurate thread cutting, with very brief setup time necessary. The block tool can also provide for additional setup time saving if specifications call for both right and left-hand thread on single piece of stock. By means of the previously indicated process, thread-cutting tool bits can be ground, as a single unit, for both right and left-hand thread cutting.

The block tool-cradle provides for adjusting the tool bit cutting-edge angle for cutting in either direction, therefore the setup time necessary for changing the thread-cutting direction is very brief, compared to that necessary if other types of thread-cutting tools and equipment are used.

I claim:

1. In a block tool, the combination of a block member, said block member having self-contained means for supporting a pair of tool-cradles, each of said tool-cradles comprising a supporting means for a tool bit member, and said block member being secured to a lathe by means of an anchor bolt receivable through an adjusting plate and through a block member, said anchor bolt being secured by means of a washer and a nut positioned upon an opposite side of said block member respective to a side said anchor bolt enters said block, said block member being provided with a pair of diagonal slots on opposite sides thereof, each of said diagonal slots receiving said tool-cradle, said tool-cradle having an opposite diagonal slot in an outer side thereof for receiving a cutoff tool bit, said tool-cradle having a threaded opening receiving a locking screw for securement against said side of said block member and said tool bit being secured on said tool-cradle by means of a clamp mounted upon said tool-cradle by a screw.